(12) United States Patent
Mendonça Da Silva Gonçalves et al.

(10) Patent No.: US 11,388,310 B2
(45) Date of Patent: Jul. 12, 2022

(54) COMPUTER METHOD AND SYSTEM FOR GENERATING IMAGES WITH ENCODED INFORMATION, IMAGES OBTAINED BY THIS METHOD AND IMAGE READING METHOD AND SYSTEM

(71) Applicants: IMPRENSA NACIONAL-CASA DA MOEDA, SA, Lisbon (PT); UNIVERSIDADE DE COIMBRA, Coimbra (PT)

(72) Inventors: Nuno Miguel Mendonça Da Silva Gonçalves, Lisbon (PT); Bruno André Santos Patrão, Coimbra (PT); Leandro Moraes Valle Cruz, Coimbra (PT); João Pedro De Almeida Barreto, Coimbra (PT)

(73) Assignees: UNIVERSIDADE DE COIMBRA, Coimbra (PT); IMPRENSA NACIONAL-CASA DA MOEDA, SA, Lisbon (PT)

( * ) Notice: Subject to any disclaimer, the term of this patent is extended or adjusted under 35 U.S.C. 154(b) by 0 days.

(21) Appl. No.: 16/650,503

(22) PCT Filed: Sep. 25, 2018

(86) PCT No.: PCT/IB2018/057411
§ 371 (c)(1),
(2) Date: Mar. 25, 2020

(87) PCT Pub. No.: WO2019/064177
PCT Pub. Date: Apr. 4, 2019

(65) Prior Publication Data
US 2020/0279346 A1    Sep. 3, 2020

(30) Foreign Application Priority Data
Sep. 26, 2017    (PT) .......................................... 110303

(51) Int. Cl.
*H04N 1/32* (2006.01)
*G06T 1/00* (2006.01)

(52) U.S. Cl.
CPC ....... *H04N 1/32304* (2013.01); *G06T 1/0071* (2013.01); *H04N 1/32149* (2013.01); *H04N 1/32203* (2013.01); *G06T 2201/0051* (2013.01)

(58) Field of Classification Search
USPC ....................................................... 358/3.28
See application file for complete search history.

(56) References Cited

U.S. PATENT DOCUMENTS

| | | | |
|---|---|---|---|
| 6,798,542 B1 * | 9/2004 | Kimura | H04N 1/32144 358/3.02 |
| 10,395,155 B2 * | 8/2019 | Shen | G06K 19/06093 |

(Continued)

FOREIGN PATENT DOCUMENTS

WO    2005029390 A2    3/2005

OTHER PUBLICATIONS theinfoshpere.org, 2015-2017 (Year: 2016).*

(Continued)

*Primary Examiner* — Barbara D Reinier
(74) *Attorney, Agent, or Firm* — The Roy Gross Law Firm, LLC; Roy Gross (57) ABSTRACT

This invention falls within the scope of steganography, i.e., encoding of information (such as a text) into other information, for example, an image. It is the object of this invention a computational method for generating at least one image with coded information comprising the steps of: i) associating an information to be coded to a plurality of graphic elements, each of the graphic elements consisting of a symbol out of a plurality of symbols, thus generating a pattern of graphic elements and ii) generating at least one image comprising at least one pattern obtained from step i).

(Continued)

This method introduces a consistent and highly flexible way of encoding information into an image. Additionally, this invention has also as object a system associated to the said method, images obtained from the said method, as well as a reading method and system thereof.

15 Claims, 3 Drawing Sheets

(56) References Cited

U.S. PATENT DOCUMENTS

| | | | |
|---|---|---|---|
| 2002/0054355 A1* | 5/2002 | Brunk | H04N 1/32144 358/3.28 |
| 2006/0198559 A1* | 9/2006 | Manico | H04N 1/00132 382/305 |
| 2007/0076261 A1* | 4/2007 | Ito | H04N 1/00854 358/3.28 |
| 2007/0098234 A1 | 5/2007 | Fiala | |
| 2007/0153331 A1* | 7/2007 | Ueda | H04N 1/00132 358/1.18 |
| 2008/0035730 A1* | 2/2008 | Look | G06K 19/06046 235/462.07 |
| 2011/0194726 A1 | 8/2011 | Das Gupta et al. | |
| 2017/0109857 A1* | 4/2017 | Chen | G06T 1/0028 |

OTHER PUBLICATIONS

Status of encoding of Wingdings and Webdings Symbols, ISO/IEC 10646:2012 (Year: 2012).*
Mei et al., a. Data hiding in binary text documents, Proc. SPIE 4314, Security and Watermarking of Multimedia Contents III, (Aug. 1, 2001) (Year: 2001).*
PCT International Search Report for International Application No. PCT/IB2018/057411, dated Jan. 31, 2019, 7pp.
PCT Written Opinion for International Application No. PCT/IB2018/057411, completed Jan. 22, 2019, 7pp.

* cited by examiner

COMPUTER METHOD AND SYSTEM FOR GENERATING IMAGES WITH ENCODED INFORMATION, IMAGES OBTAINED BY THIS METHOD AND IMAGE READING METHOD AND SYSTEM

CROSS REFERENCE TO RELATED APPLICATIONS

This application is a National Phase of PCT Patent Application No. PCT/IB2018/057411 having International filing date of Sep. 25, 2018, which claims the benefit of priority of Portugal Application No. 110303 filed on Sep. 26, 2017. The contents of the above applications are all incorporated by reference as if fully set forth herein in their entirety.

FIELD OF THE INVENTION

This invention falls within the scope of steganography, i.e., encoding of information (such as a text) into other information, for example, an image.

BACKGROUND OF THE INVENTION

The most known method of steganography in the state-of-the-art is referred to as Least Significant Bit (LSB), wherein the least significant pixel bit of an image is used to encode information. However, when intending to retrieve this information from a printed image, one verifies that the LSB technique is not consistent, since both the image capture and the print bring variations in the colours and positions of the pixels, thus destroying the variation controlled by this technique.

Another methodology named as Q Art Code is also known in the state-of-the-art, wherein a region of a QR code (Quick Response code, a two-dimensional graphic code technology) is changed in order to contain a visually recognizable image. However, such a technique leads to the need to enter unnecessary information into the image, which consists of reading recognizable control patterns. There is also dependence from the image as an aesthetic and a recognizable element by a human being when generating an image according to this methodology, which is highly limiting.

The present invention thus introduces a consistent and highly flexible way of encoding information into an image.

SUMMARY OF THE INVENTION

It is thus an object of this invention a computational method for generating at least one image with coded information comprising the steps of:
i) associating an information to be coded to a plurality of graphic elements, each of the graphic elements consisting of a symbol out of a plurality of symbols, thus generating a pattern of graphic elements;
ii) generating at least one image comprising at least one pattern obtained from step i).

Such a method allows an image to be generated in a way that is dependent on the information to be coded, thus bringing high flexibility and security, since the generation of a pattern of graphic elements anticipates the generation of the image.

In an improved embodiment of the method of the present invention, the generation of the said pattern of step i) is obtained from:

obtaining a plurality of graphic elements, each of them having a predefined position;
associating the information to be encoded with the plurality of graphic elements, thus determining the symbol of each graphic element and hence obtaining the graphic elements pattern.

This set of steps in the generation of the pattern allows, in a simple and fast way, to obtain a graphic pattern, associating the information to the code. Specifically, a "structure"—which corresponds to the set of predefined positions—is already specified, this set of positions being used, by means of association of the information to the set of symbols obtained, so as to encode the information in an obtained pattern.

In another improved embodiment of the method of the present invention, step i) further comprises:
obtaining at least a first pattern comprising a plurality of graphic elements, each graphic element consisting of a first symbol out of a plurality of first symbols and
obtaining at least a second pattern comprising another plurality of graphic elements, each other graphic element consisting of a second symbol out of a plurality of second symbols,
wherein:
the pre-defined positions of the graphic elements of the first pattern are identical to the pre-defined positions of the graphic elements of the second pattern and
the first pattern comprises the same number of graphic elements as the second pattern.

As a consequence, according to this improved embodiment of the image generation method of the present invention, it is possible to achieve greater encoding of the information, thus ensuring an increased safety. Such an advantage is associated to the fact that, by obtaining at least two patterns—both of which may be applied in the same image or in separate images—and the two patterns being related to each other by having the same number of graphic elements and an identical set of predefined positions, it is possible to embed a certain information in a pattern and another related information into another pattern. As an example, this scheme allows one pattern to contain information encrypted with a key while the other pattern consists of the key.

In a preferred and advantageous configuration of the generation method of the present invention, the step (ii) for generating at least one image comprises:
sectioning the pattern in a plurality of cells of equal size, each cell being comprised of a number of graphic elements constituting the pattern and
inserting each of said cells into a secondary graphic element of a plurality of secondary graphic elements, thus obtaining a composite pattern.

This scheme is advantageous in as much as it enables the creation of a graphically more complex image, separating several elements of one same pattern through several "cells" that preferably contain an equal number of graphic elements. Thus, only prior knowledge of the arrangement of the various elements by the various cells configuring a pattern would even allow for conceiving the existence of a pattern in the resulting image. Consequently, this provides higher security in the coded information. Preferably, said insertion consists in overlapping each of the said cells to a secondary graphic element, each secondary graphic element having a size larger than each cell of the same size.

In yet another preferred and advantageous configuration of the generation method of the present invention, step (ii) for generating at least one image comprises filling the entirety of a predefined area with said at least one pattern, and with a plurality of filling units consisting of a symbol from the same plurality of symbols as the graphic elements, the symbol of each filling unit being randomly selected from the plurality of symbols. Therefore, the pattern is completely embedded in graphical elements identical to each other, since the plurality of symbols of said filling units is the same as the graphic elements that configure the pattern, except that these symbols (of the filling units) are randomly obtained, thus being necessarily distinct from the symbols of the graphic elements constituting the pattern.

In another improved embodiment of the generation method of the present invention, step ii) for generating at least one image further comprises the steps of:

obtaining a greyscale base image and the greyscale value of each pixel of the base image;

converting each pixel of said base image into a square cell with side K pixels, each pixel consisting of a graphic element, and each of said graphic elements consisting of a symbol which in turn consists of a white pixel or a black pixel, the number of white or black graphic elements in a square cell corresponding to the greyscale value of the pixel to be converted, thus obtaining a black and white converted image;

replacing an area of the converted black and white image with the pattern obtained from step i), the said pattern comprising a plurality of graphic elements consisting of a symbol which in turn consists of a white pixel or a black pixel;

generating at least one image comprising the said black and white converted image.

This encoding method created on the methodology described above is based on dithering, i.e., passing an initial image which is called a base image—from a greyscale to black and white, and thereby encoding the information by associating black and white pixels to a greyscale of one pixel of the base image. Thus, the information to be encoded becomes embedded in an image that was originally in a greyscale, thereby providing a more flexible method, which is suitable for a higher number of initial/base images.

In yet another advantageous embodiment of the method of the present invention, the generation of at least one pattern from step i) comprises:

obtaining at least two distinct symbols, and obtaining a predefined number of pattern-constituting graphic elements grouped in the same cell and consisting of one of said distinct symbols, each cell being comprised of an equal number of graphic elements, the coded information being associated to the plurality of graphic elements by the ratio of the distinct graphic elements in the same cell. In this case, there is a quantization of graphic elements, thus obtaining an additional level of coding, associating the information to be coded to a predefined number of pattern-constituting graphic elements grouped in the same cell. In this case, preferably, the said at least two distinct base units consist of a white pixel or a black pixel, and the said value corresponding to encoded information consisting of a greyscale value, which is obtained according to the ratio of white pixels and black pixels in one same cell.

In another advantageous embodiment of the more complex generation method of the present invention, it comprises generating a first image whose symbols consist of geometric and complex shapes and generating a second image based on said dithering scheme whose symbols are of the pixel type, the first image containing at least one pattern whose graphic elements have a predefined position identical to the predefined position of the graphic elements of at least one pattern of the second image. This consists of a more specific embodiment of another one previously described, wherein two patterns in two distinct images are related to each other in that they have the same number of graphic elements and an identical set of predefined positions, allowing to embed certain information in a pattern and other related information in another pattern. Alternatively, the two patterns are not related to each other, the number of graphics and/or the set of predefined positions of the first and second patterns being different. Preferably, the first image corresponds to a decryption key of information encoded in at least one pattern comprised in the second image.

In several embodiments of the method of the present invention, the said symbols vary in colour and/or shape.

Also an object of the present invention is an illustration with coded information comprising a first image and a second image obtained from the above described method, with a first image obtained according to the said dithering-based scheme whose symbols are of the pixel type, and a second image whose symbols consist of geometric and complex forms.

Additionally, it is an object of the present invention a digital image with encoded information obtained from the above described method, in any of its configurations, the said digital image being preferably rectangular.

On the other hand, an object of the present invention is an image printed on a physical support with coded information, which is obtained from the above described method, in any of its configurations, and a subsequent step of:

printing on physical support, the latter being preferably cellulose-based or engraving onto a physical support, the latter being preferably metal-based, more preferably a metal alloy, or consisting of a metallised or non-metallised polyester film, optically variable, or made from a basically polymeric material, this digital image being preferably rectangular. Such a physical support may consist of a stamp, a label or a tag or any other document, such as a card, an identification card or a certificate/attestation or a postcard. Another feasible alternative is engraving/printing in money.

Additionally, it is also an object of the present invention an illustration with coded information comprising at least one digital image as described above or at least one image on a physical support as described above, and a peripheral area, the said image being disposed within the peripheral area, not intersecting it, and preferably comprising a substantially linear contour, arranged in such a way that it separates the peripheral area and the said image. Preferably, such a substantially linear contour consists of a linear sequence of white cells with black centre and black cells with white centre, yet more preferably these cells forming squares.

The present invention further comprises another object related to the reading of images as disclosed above, or otherwise obtained from the generation method as described above.

It is thus an object of the present invention a computational method for reading information encoded in an image comprising the following steps:

i) obtaining an image, which in its turn is obtained from the method for generating an image as described above;

ii) identifying symbols on said image;

iii) going through the symbols identified in the image in a predetermined order and comparing sets of symbols with a plurality of stored patterns.

This allows the existence of tables that match certain sets of information to symbols, that is, stored patterns to information, thus forming a dictionary.

In a preferred and advantageous mode of the reading method of the present invention, the said obtainment of an image comprises the digital acquisition of a printed image, said printed image comprising a peripheral area, the said image with symbols being disposed within the peripheral area, not intersecting it, and comprising a substantially linear contour, arranged in such a way that it separates the peripheral area and the said image. Such a configuration makes it possible to better identify the region where patterns are found and, consequently, those same patterns. Preferably, the said symbol identification comprises identifying the said peripheral area and the consequent identification of symbols within said peripheral area.

In another preferred and advantageous embodiment of the reading method of the present invention, said identification of symbols in an obtained image further comprises a pixel repositioning step of the obtained image, the said pixel repositioning comprising:
  identifying a neighbouring set of N pixels adjacent to a first set of K×K pixels, N and K consisting of non-negative integers;
  comparing the neighbour set with an expected neighbour set, said expected neighbour set consisting of a stored pattern;
  determining the position that minimizes a norm of the difference between the neighbour set and the expected neighbour set;
  positioning of a new pixel in the position of the previous step;
  propagating the previous steps by all the pixels of the obtained image; thus obtaining a repositioned obtained image.

This set of steps consists of a highly efficient symbol recognition methodology, unlike other methods known in the art in which there is a subdivision of an image into blocks with the same amount of pixels, quite susceptible to distortions during an image acquisition phase, such as in a photo. Preferably, this method is implemented by comparing at least a first pixel having a distinct colour from adjacent P pixels of the same colour, P consisting of a non-negative integer, with consequent colour change from that first pixel to the colour of the adjacent P pixels, where P is preferably equal to 8.

In a preferred embodiment of the reading method of the present invention, it comprises identifying the colour and/or the shape of symbols contained in an obtained image.

Also an object of the present invention is a computational system for generating at least one image with coded information, comprising computational means and image generation means that are configured to implement the method for generating at least one image with coded information of this invention, in any of the configurations thereof. Preferably configured, the said means are additionally configured to generate at least one illustration and/or at least one image according to the present invention as described above.

It is also an object of the present invention an apparatus for reading information encoded in a computer image, which comprises computational means and preferably optical reading means, preferably consisting of a photo camera, configured to implement the method designed for reading the information encoded in an image of the present invention, in any of its described configurations.

DESCRIPTION OF THE FIGURES

FIG. 1—representation of an embodiment of an illustration (10) obtained from the method of the present invention. In this case, the illustration (10) contains two images (20), each one of them comprising a pattern obtained from said method. The two images (20) may be related, in particular by the same number of graphic elements and an identical set of pre-defined positions. The left-hand image comprises a set of pixel-like symbols (11) and the right-hand image a set of symbols (11) consisting of geometric and complex shapes. The characteristics of the two types of symbol (11) are distinct, it being readily understood that the pixel-like symbols (11) are of smaller size (typically) and the symbols (11) consisting of complex and geometric shapes allow for a variety of shapes.

FIG. 3—representation of an embodiment of an image (20) obtained from the method of the present invention. This image comprises symbols (11) which consist of geometric and complex shapes, which specifically consist of triangles and squares (and which may also vary in colour), an image (20) being thus obtained which contains not only a pattern but also a set of symbols (11) randomly obtained, therefore "hiding" or embedding the pattern in a general image (20). Also this pattern is obtained by the disclosed method, and corresponds to the coded information.

FIG. 4—representation of a set of patterns and images (20) obtained from the method of the present invention. It should be noted that figures a) and c) are related, since they contain the same pattern, which only varies in the symbols (11) used. Figures (b) and (c) are also related because they consist of divisions of two patterns that relate to each other, with cells being thus obtained, these patterns varying only in the symbols (11) used. These divisions may be embedded in secondary graphic elements, thus obtaining a composite pattern, as is the case of Figure d) containing the pattern of figure c), or of figure e), which comprises two cells of Figures b) and d). Figure f) represents a certain set of predefined positions in a cell constituting a pattern, and figures g) and h) represent, respectively, two patterns with distinct symbols (g) but sharing the same sequence, associated to the coded information contained in h).

DETAILED DESCRIPTION OF THE INVENTION

The more general advantageous configurations of the present invention are described in the Summary of the invention. These configurations are detailed below in accordance with other advantageous and/or preferred embodiments of the present invention.

Figure 1:
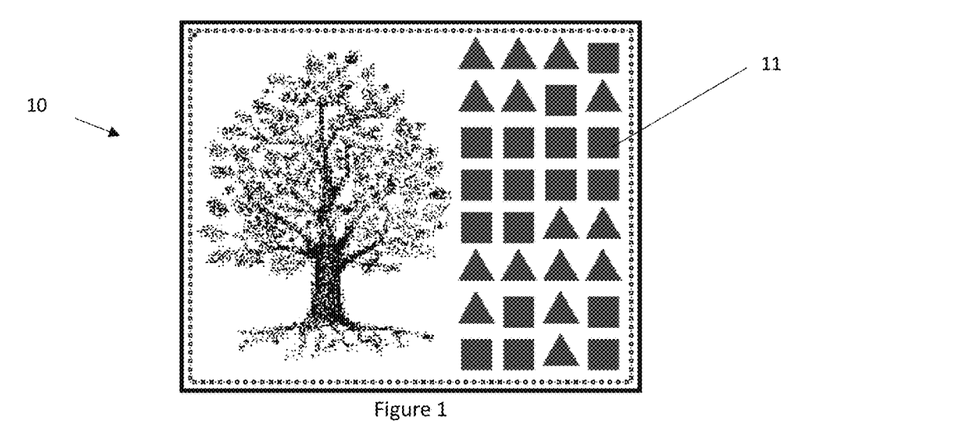
Figure 2:
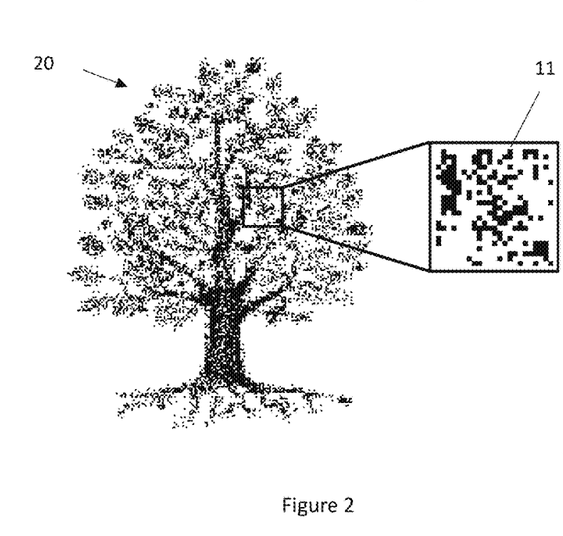
FIG. 2—representation of an embodiment of an image (20) obtained from the method of the present invention. This image comprises pixel-like symbols (11) consisting of black or white pixels, an image (20) being thus obtained which represents a tree. In this image a pattern is comprised which is obtained by the method described, and which corresponds to the coded information.
Figure 3:
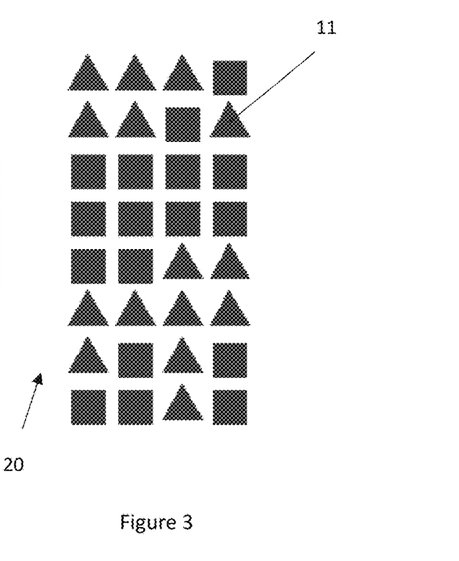

In one embodiment of the present invention, it comprises generating a pattern, and consequently an image, through an array of graphic elements (e.g., pixels of an image (20) or geometric shapes of a hologram) so as to encode information without this being intelligible to a human seeing such an image. In this embodiment, the symbols (11) constituting the graphic elements constituting the images (20) which in turn may be of two kinds: Pixel (PM) and Shape Map (SM), i.e. the latter (SM) consist of geometric and complex forms. FIG. 1 illustrates these two types of visual elements. On the left, the representation of a tree is based on symbols (11) of PM type (composed only by black and white pixels, although when viewed from a distance we have the sensation that there are pixels of other shades of grey); while the representation on the right, consisting of triangles and squares, is of the SM type.

A PM-based image (20) may consist of a digital image (20) created with a suitable resolution for the printing technique to be used, as well as the ability of a common photo camera to recognize such pixels from a photograph of such image printing. An SM-based image (20) may consist of an image (20) composed of small geometric shapes or small drawings. The said image (20) may normally be printed (for example, using a laser printer on a paper, offset), or printed on other materials (for example, a security hologram generated by electron beam lithography).

A pattern consists of an array of graphic elements that comprise an image (20) or visual element, or at least part of that image. In one embodiment, the position of the elements is defined from a reading-and-writing structure, which determines the position of the graphic elements. A pattern comprises graphic elements which in turn consist of symbols (11) out of a plurality of symbols (11), and such association is stored in what may be referred to as a dictionary. Once the dictionary is defined, it is possible to create a pattern and thus a visual element with a coded message, as well as decode a message contained in an image.

A pattern is composed of graphical elements which may consist of symbols (11) out of a plurality of symbols (11). For example, the symbols (11) of a black and white image (20) consist of a black pixel and a white pixel. In addition to the symbols (11), it is necessary to define a structure of predefined positions of the graphic elements corresponding to symbols (11). This structure defines the position of each graphic element. Once the positions have been defined, it is possible to obtain several patterns.

Figure 4:
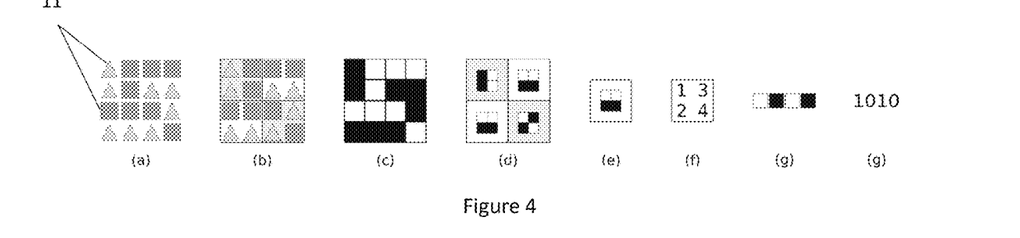

FIG. 4 shows two patterns among which only the symbols (11) corresponding to the graphic elements vary. The image 4a shows a visual element composed of symbols (11) of the SM type. The graphic elements are divided into sets of 4 units, as highlighted in FIG. 4b (cells). Similarly, the images 4c and 4d show patterns composed of black and white pixels, as well as their division into cells, according to an embodiment of the present invention. Such images (20) contain 4 cells, each one of them with 4 graphic elements. All cells conform to a pattern, that is, a specific distribution of the graphic elements. The cells highlighted in image 4e were created using the structure shown in image 4f. In this way, the elements of a cell are interpreted sequentially, as shown in image 4g. Finally, in this embodiment each graphic element is associated to an index (the position of the graphic elements, in sequence). Therefore, this graphic sequence can be interpreted abstractly as a numerical sequence. In this example, black pixels and triangles are associated to index 0, while white pixels and squares are associated to index 1. This numerical sequence allows a dictionary to be defined.

In one embodiment, it is possible to represent a dictionary in a more generic way by replacing the pattern applied to a set of symbols (11) with a sequence of indexes. Accordingly, a same dictionary can be used to encode and decode information in patterns generated with graphic elements to which distinct symbols (11) correspond (with the restriction that the two patterns contain an equal number of graphic elements).

In one embodiment, the pattern contains a distribution of graphic elements to which a given quantum value can be associated. For example, in a 2×2 pattern formed by two graphic elements, to which two distinct symbols (11) correspond, we can have the following configurations:

| Amount of symbol 1 | Amount of symbol 2 | Quantum |
|---|---|---|
| 0 | 4 | 0 |
| 1 | 3 | 1 |
| 2 | 2 | 2 |
| 3 | 1 | 3 |
| 4 | 0 | 4 |

From the quantization of a base image (20) we can establish a relation between a pattern and a quantum. For instance, in the examples, considering graphic elements corresponding to black (symbol (11) 1) and white (symbol (11) 2) pixels, it is possible to quantize a grey scale image (20) in five grey tones (0, 64, 127, 192, 255). Each tone can be associated with a specific quantum. In this way, it is possible to start from a greyscale image (20), quantizing that image (20) and encoding a message at the positions associated to the pixels/symbols (11) whose colour is associated to the quantum used in a dictionary.

In an embodiment of the decoding method of the present invention, it comprises the step of going through an image obtained (e.g., by a photo camera) in a specific order by looking for sets of graphic elements defining a pattern in a dictionary, this dictionary being stored. Once the said pattern has been identified, it is possible to identify a message associated with it by referring to said dictionary.

For the purposes of the present embodiment, it is considered that the image (20) to be decoded is printed. Thus, in a first step, a photograph of this image (20) must be captured and then one or more existing patterns therein shall be obtained in order to perform a decoding process.

In this embodiment, and as regards the image acquisition details, raw data captured by a photo camera are used.

From these raw data, a rectangular image (20) is obtained whose resolution is an integer multiple of the resolution of a possible image, obtained according to this invention, contained in the captured photograph. Since the images (20) may have different aspect ratios—according to the symbols (11)/graphic units/patterns therein—it is necessary to identify a layout from that photograph.

To that end, in this embodiment, the said substantially linear contour is used, in the present embodiment consisting of an edge around the image (20) that can be efficiently identified. This can be implemented by searching for contours in the captured image (20). Among the contours found, a contour is selected that is well approached by a quadrilateral and whose area is preferably proportional to the resolution of the photograph. Then, a homography is estimated from the vertices of this rectangle. From this homography, it is possible to apply a warping or rectification on the photograph and, finally, to make a cut based on the identified rectangle. This process results in an image (20) that may be larger than the visual identity, but its dimensions keep the said aspect ratio.

Figure 5:
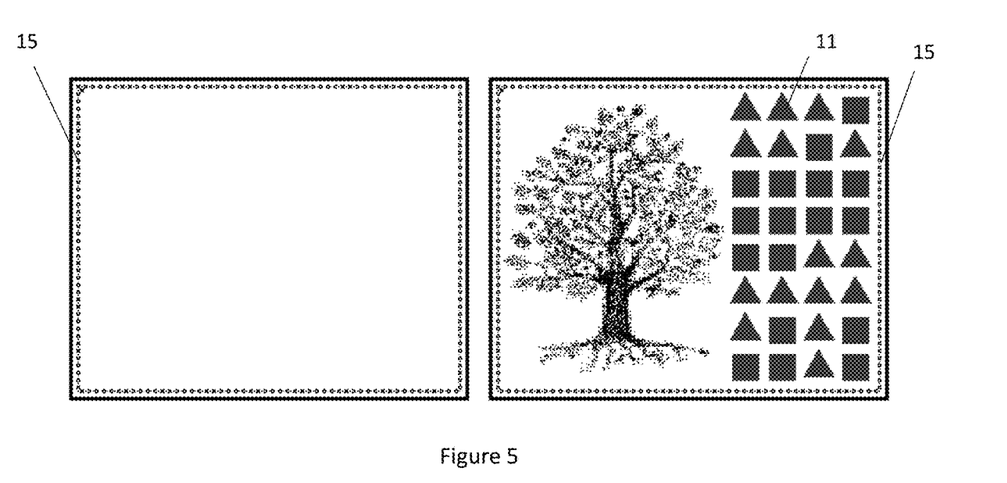
FIG. 5—representation of an embodiment of images (20) obtained from the method of the present invention, the left-hand image (20) consisting of the substantially linear contour, arranged in such a manner as to separate the peripheral area (15) and said image, with the specific configuration of a linear sequence of white cells with black centre and black cells with white centre, these cells forming squares. In the right-hand image (20), this substantially linear contour is comprised in an illustration (10) according to the present invention delimiting two images (20).
Figure 6:
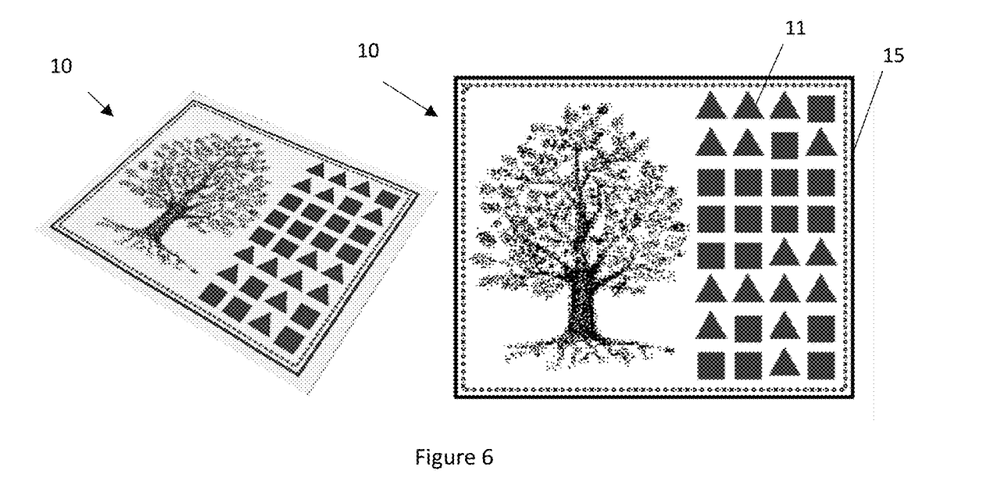
FIG. 6—representation of an embodiment of part of the process for decoding the information in an image, including an acquired image (on the left, acquired via, for example, a photo camera) and an image (20) where the substantially linear contour, in this case consisting of a rectangle, has already been identified.
Figure 7:
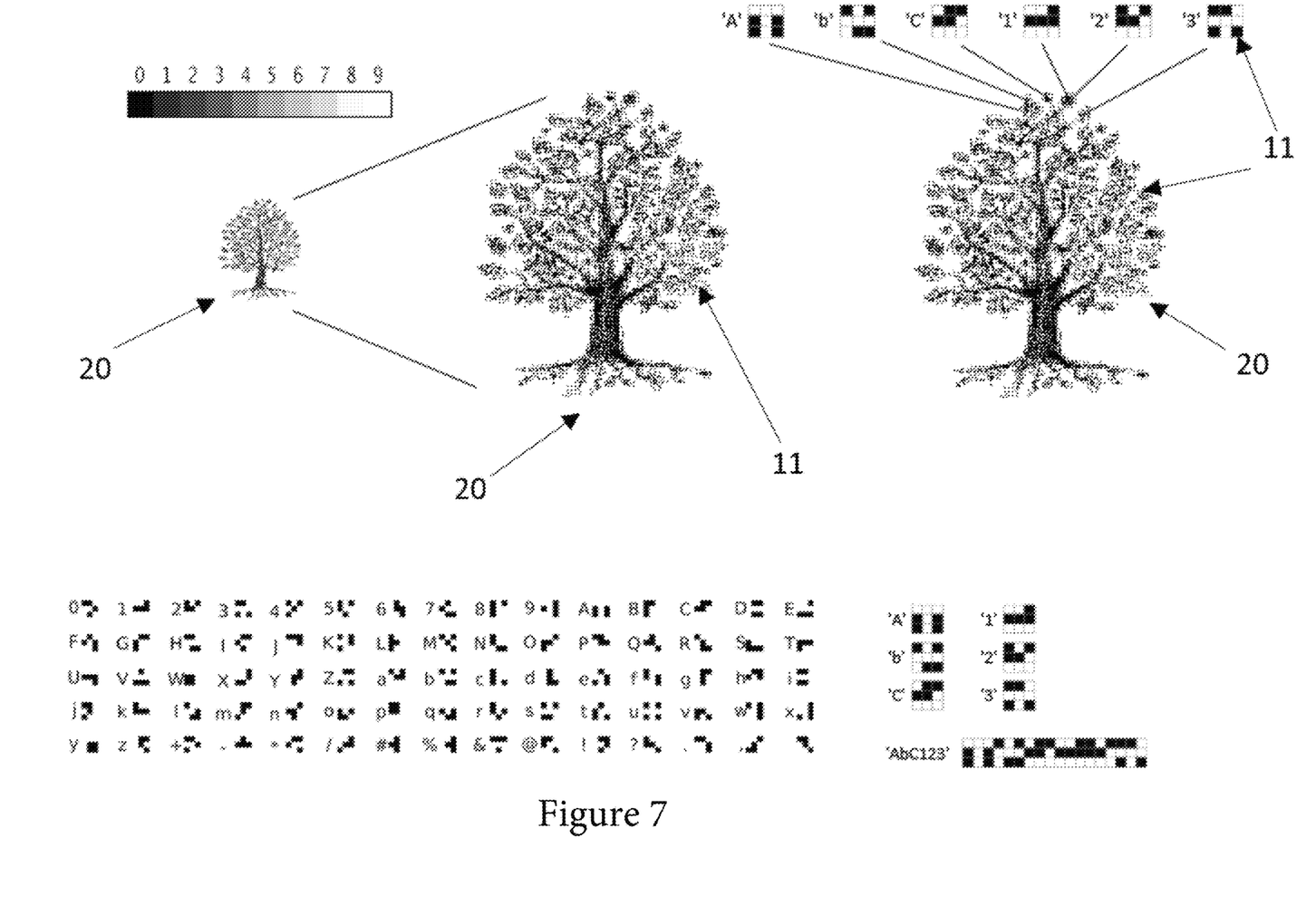
FIG. 7 is a representation of an embodiment showing a graphic element and each of said graphic elements consisting of a symbol (11), which in turn consists of a white pixel or a black pixel.

FIG. 6 shows on the left side a photographic image (20) which contains an image obtained according to the method of the present invention, with two patterns. This image (20) comprises an edge such as the one in the left image (20) of FIG. 5. On the right, an image (20) is shown which results from the edge identification process of the above-described embodiment.

The edge of the image (20) of FIG. 6 contains a continuous black rectangular contour which is positioned in the outermost portion. This contour consists of two sets of 3×3 graphic elements, these graphic elements consisting of symbols (11) which in turn consist of white or black pixels (a set with the 8 external graphic elements consisting of black pixels, and the internal of white pixels or vice versa). The method of the above-described embodiment is based on the edge, i.e. on the outer continuous contour.

The approach of this embodiment of the decoding method of the present invention comprises repositioning the samples of the pixels passing through the centre of the patterns of said edge. For each of these pixels, a set of neighbouring K×K pixels is tested and a neighbourhood is compared around this neighbour set with the expected neighbourhood (since the edge pattern is known). The position of the pixel that minimizes the norm of the difference between neighbourhoods will be the new position of the respective sample.

This repositioning is propagated to the pixels within the image (20) by an interpolation process. The horizontal variations of the upper and lower edges will be interpolated to correct the abscissae of the samples, while the vertical variations of the right and left edges will be used to correct the ordinates of the samples.

In addition to said overall repositioning performed from the edge repositioning of this embodiment, a local repositioning approach is also implemented. This approach is accomplished by identifying isolated points along the image (20) with coded information. These points are either black pixels in which the closest 8 neighbours are white, or white pixels whose closest 8 neighbours are black (similar to those used at the edge). Among all detected contours, the chosen ones are those which satisfy a rule based on pre-defined diameter and occupied area.

In this embodiment, the most direct approach for recognizing the colour of a pixel is to use a predefined threshold. Thus, after determining the position of the sample, the colour of the respective pixel will be black if the sample's grey level is less than the threshold, otherwise the colour of the pixel will be white.

In this embodiment, after identifying the area containing the image (20) with encoded information, a search and identification of shapes contained therein, i.e., the graphic elements, is initiated. These may consist of symbols (11) which are basic shapes (such as squares, triangles, circles, etc.) or more complex and elaborate shapes (such as blazons, shields, etc.).

In the case of simple shapes, a segmentation of the area of the acquired image (20) is performed into sections and with the aid of a contour detector the graphic unit in the section is identified and recorded.

In the case of more complex shapes, the same process is used, associated to a detector and descriptor of characteristics. Each graphic element must have a unique set of characteristics, enabling the identification of which one is present in each field of the cell. Such identification may be carried out by any means known in the state of the art.

Said camera consists of any type of equipment capable of capturing images, which may include a mobile phone or a scanner.

As will be evident to the person skilled in the art, this invention should not be limited to the embodiments described herein, and a number of changes are possible which remain within the scope of the present invention.

Obviously, the different configurations and embodiments shown above are combinable, in the different possible forms, the repetition of all such combinations being herein avoided.

The invention claimed is:

1. A computational method comprising:
   i) associating information to be encoded with a plurality of graphic elements, each of the plurality of graphic elements consisting of a symbol (11) out of a plurality of symbols (11), wherein the symbols (11) consist of a pattern of graphic elements selected from a Pixel Map (PM) and/or Shape Map (SM), wherein the Pixel Map (PM) consists of white pixels and black pixels and the Shape Map (SM) consists of geometric and complex forms; and
   ii) generating at least one image (20) with coded information comprising at least one pattern obtained from step i);
   iii) identifying symbols (11) on said at least one image,
   iv) reading the coded information on said at least one image (20) by going through the symbols (11) identified in said at least one image (20) in a predetermined order and comparing sets of symbols (11) with a plurality of stored patterns;
   wherein the obtainment of said at least one image (20) comprises a digital acquisition of a printed image to produce an obtained image, the printed image comprising a peripheral area (15), said at least one image (20) with the plurality of symbols (11) being disposed within the peripheral area (15), not intersecting it, and comprising a substantially linear contour, arranged in such a way that it separates the peripheral area (15) and said at least one image (20);
   wherein the identification of symbols (11) comprises identifying said peripheral area (15) and the consequent identification of symbols (11) within said peripheral area (15); and
   wherein said identification of symbols (11) in the obtained image further comprises a pixel repositioning step of the obtained image, said pixel repositioning comprising:
   identifying a neighboring set of N pixels adjacent to a first set of K×K pixels, N and K consisting of non-negative integers;
   comparing the neighboring set with an expected neighboring set, said expected neighboring set consisting of a stored pattern;
   determining the position that minimizes a norm of the difference between the neighboring set and the expected neighboring set;
   positioning of a new pixel in the position of the previous step; and
   propagating the previous steps by all the pixels of the obtained image; thus obtaining a repositioned obtained image.

2. The computational method of claim 1, wherein the generation of said at least one pattern from step i) comprises:
obtaining the plurality of graphic elements, each one having a predefined position;
associating the information to be encoded to the plurality of graphic elements, thus determining the symbol (11) of each graphic element and thereby obtaining the pattern of graphic elements.

3. The computational method of claim 1, wherein step i) further comprises:
obtaining at least a first pattern comprising the plurality of graphic elements, each of the plurality of graphic elements consisting of a first symbol (11) out of a plurality of first symbols (11); and
obtaining at least a second pattern comprising another plurality of graphic elements, each other graphic element consisting of a second symbol (11) out of a plurality of second symbols (11),
wherein:
a certain number of the pre-defined positions of the plurality of graphic elements of the first pattern are identical to a certain number of the pre-defined positions of the plurality of graphic elements of the second pattern; and
the first pattern comprises the same number of graphic elements as the second pattern.

4. The computational method of claim 1, wherein the step ii) for generating at least one image, comprises:
sectioning the pattern in a plurality of cells of equal size, each cell being comprised of a number of graphic elements constituting the pattern; and
inserting each of said cells into a secondary graphic element of a plurality of secondary graphic elements, thus obtaining a composite pattern.

5. The computational method of claim 1, wherein the step ii) for generating at least one image comprises filling the entirety of a predefined area with the pattern of the plurality of graphic elements, and with a plurality of filling units consisting of a symbol (11) from the plurality of symbols (11), the symbol (11) of each filling unit being randomly selected from the plurality of symbols (11).

6. The computational method of claim 2, wherein the generation of the at least one pattern from step i) comprises:
obtaining at least two distinct symbols (11), and
obtaining a predefined number of pattern-constituting graphic elements grouped in one same cell and consisting of one of said distinct symbols (11), each cell being comprised of an equal number of graphic elements,
the coded information being associated to the plurality of graphic elements by a ratio of white pixels and black pixels in one same cell.

7. The computational method of claim 1, wherein a first image (20) from claim 1 is generated, and a second image (20) the first image (20) containing the at least one pattern whose graphic elements have a predefined position which is identical to the predefined position of the graphic elements of the at least one pattern of the second image (20) in a certain number of positions.

8. The computational method of claim 7, wherein the first image (20) corresponds to a decryption key of encoded information in the at least one pattern comprised in the second image (20).

9. The computational method of claim 1, wherein said plurality of symbols (11) vary in color and/or shape.

10. The computational method of claim 1, wherein the obtainment of said at least one image (20) comprises the digital acquisition of the printed image, the printed image comprising a peripheral area (15), said at least one image (20) with the plurality of symbols (11) being disposed within the peripheral area (15), not intersecting it, and comprising the substantially linear contour, arranged in such a way that it separates the peripheral area (15) and said at least one image.

11. The computational method of claim 1, characterized in that it is implemented by comparing at least a first pixel having a distinct color from adjacent P pixels of the same color, P consisting of a non-negative integer, and with a consequent color change from the first pixel to the color of the adjacent P pixels, where P is preferably equal to 8.

12. The computational method of claim 1, further comprising identifying the color and/or the shape of symbols (11) contained in the obtained image.

13. An illustration (10) with the coded information, comprising the first image (20), and the second image (20) obtained from the computational method according to claim 8.

14. A digital image (20) with the coded information obtained from the computational method claim 1, wherein said digital image (20) is rectangular.

15. An image printed on a physical support with the coded information, obtained from the computational method according to claim 1 and from a subsequent step of:
printing on physical support, the latter being preferably cellulose-based or
engraving onto a physical support, the latter being preferably metal-based, more preferably a metal alloy, or consisting of a metalized or non-metalized polyester film, optically variable, or made from a basically polymeric material,
wherein the image is rectangular.

* * * * *